US012271510B2

(12) United States Patent
Xu et al.

(10) Patent No.: US 12,271,510 B2
(45) Date of Patent: Apr. 8, 2025

(54) METHOD FOR IMPLEMENTING FIRMWARE ROOT-OF-TRUST, AND APPARATUS, DEVICE AND READABLE STORAGE-MEDIUM THEREOF

(71) Applicant: SUZHOU METABRAIN INTELLIGENT TECHNOLOGY CO., LTD., Jiangsu (CN)

(72) Inventors: Xin Xu, Jiangsu (CN); Baoxi Wu, Jiangsu (CN); Chunchao Han, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/570,631

(22) PCT Filed: May 27, 2022

(86) PCT No.: PCT/CN2022/095465
§ 371 (c)(1),
(2) Date: Dec. 14, 2023

(87) PCT Pub. No.: WO2023/123850
PCT Pub. Date: Jul. 6, 2023

(65) Prior Publication Data
US 2024/0289494 A1  Aug. 29, 2024

(30) Foreign Application Priority Data
Dec. 28, 2021 (CN) .......................... 202111616444.4

(51) Int. Cl.
*G06F 21/64* (2013.01)
*G06F 21/57* (2013.01)
*G06F 21/71* (2013.01)

(52) U.S. Cl.
CPC ............ *G06F 21/64* (2013.01); *G06F 21/572* (2013.01); *G06F 21/71* (2013.01)

(58) Field of Classification Search
CPC ......... G06F 21/64; G06F 21/572; G06F 21/71
See application file for complete search history.

(56) References Cited

U.S. PATENT DOCUMENTS

| 8,028,155 B1 | 9/2011 | Righi et al. |
| 2015/0082399 A1* | 3/2015 | Wu ...................... H04L 63/0838 726/10 |

(Continued)

FOREIGN PATENT DOCUMENTS

| CN | 106775716 A | 5/2017 |
| CN | 107861795 A | 3/2018 |

(Continued)

OTHER PUBLICATIONS

Guixiong Liu. "Embedded system firmware security verification method based on Hash algorithm." China Test, vol. 40, No. 5, May 31, 2014.

(Continued)

*Primary Examiner* — Taghi T Arani
*Assistant Examiner* — Blake I Narramore
(74) *Attorney, Agent, or Firm* — IPro, PLLC

(57) ABSTRACT

The disclosure relates to the field of computer security. Provided are a method for implementing a firmware root-of-trust, and an apparatus, a device, and a readable storage-medium thereof. The method includes: setting a storage-medium for storing state-data of the firmware root-of-trust; integrating a processing-logic of an instruction of the firmware root-of-trust into a system-firmware; initializing the firmware root-of-trust, according to the state-data of the firmware root-of-trust and a startup-command of the firmware root-of-trust; creating a node of a device-tree for the (Continued)

firmware root-of-trust, for an operating-system to load a driver-program corresponding to the firmware root-of-trust; and registering an instruction-interface of the firmware root-of-trust into an interface-list.

11 Claims, 9 Drawing Sheets

(56) References Cited

U.S. PATENT DOCUMENTS

| | | | |
|---|---|---|---|
| 2018/0285127 A1 | 10/2018 | Shang et al. | |
| 2018/0349610 A1* | 12/2018 | Gupta | G06F 9/5077 |
| 2019/0042229 A1* | 2/2019 | Kotary | G06F 8/65 |
| 2019/0095357 A1* | 3/2019 | Ozsoy | G06F 12/1441 |
| 2019/0163497 A1 | 5/2019 | Samuel et al. | |
| 2020/0012803 A1* | 1/2020 | Mannan | G06F 21/6218 |
| 2020/0097661 A1* | 3/2020 | Block | H04L 9/3271 |
| 2020/0119929 A1* | 4/2020 | Edwards | H04L 9/3265 |
| 2020/0202004 A1* | 6/2020 | Montero | G06F 21/602 |
| 2020/0218811 A1* | 7/2020 | Rangel-Martinez | G06F 21/44 |
| 2022/0006637 A1* | 1/2022 | Nevis | G06F 16/188 |
| 2022/0012088 A1* | 1/2022 | Guim Bernat | G06F 21/606 |

FOREIGN PATENT DOCUMENTS

| | | |
|---|---|---|
| CN | 108170516 A | 6/2018 |
| CN | 108572861 A | 9/2018 |
| CN | 109101284 A | 12/2018 |
| CN | 109190401 A | 1/2019 |
| CN | 109947682 A | 6/2019 |
| CN | 110109710 A | 8/2019 |
| CN | 112306754 A | 2/2021 |
| CN | 113987599 A | 1/2022 |

OTHER PUBLICATIONS

Xin Chen. "Research and implementation of trusted startup technology for embedded instrumentation based on JTAG and SM3." Network Security Technology and Application, No. 10, Oct. 31, 2021.

Peng, Shuanghe, and Zhen Han. "Design and Implementation of Portable TPM Device Driver Based on Extensible Firmware Interface." 2009 International Conference on Multimedia Information Networking and Security. vol. 2. IEEE, 2009.

* cited by examiner

Apparatus for implementing the firmware root-of-trust

Storage-medium module 1

Instruction-integration module 2

Initialization module 3

Node-creation module 4

Interface-registration module 5

FIG. 5

METHOD FOR IMPLEMENTING FIRMWARE ROOT-OF-TRUST, AND APPARATUS, DEVICE AND READABLE STORAGE-MEDIUM THEREOF

CROSS-REFERENCE TO RELATED APPLICATION

This application claims the priority of a Chinese patent application submitted to the China Patent Office on Dec. 28, 2021, with an application number CN202111616444.4 and a tile of "METHOD AND APPARATUS FOR IMPLEMENTING FIRMWARE ROOT OF TRUST, DEVICE, AND READABLE STORAGE MEDIUM", the entire contents of which are incorporated in the present disclosure by reference.

FIELD

The present disclosure relates to a field of computer security, in particular to, a method for implementing a firmware root-of-trust, and an apparatus, a device and a readable storage-medium thereof.

BACKGROUND

A root-of-trust is a security chip that stores concrete keys and data, and is used for protecting devices, disabling unauthorized programs, and eliminating any access from unauthorized users. The root-of-trust is not an essential hardware component of a computer, so a computer without the root-of-trust may not use the root-of-trust to build a secure computing environment. With developments of application scenarios, many processors have introduced TEE (Trusted Execution Environment) technology, for example, SGX technology of Intel processors, or Trust Zone of Arm. In an implementation of a firmware root-of-trust based on the TEE technology, by isolating a memory into a security domain and a non-security domain, when using the root-of-trust, it is to jump to the security domain to execute a processing-logic of an instruction of the root-of-trust; and after the processing is completed, a processing-result will be returned from the security domain to a caller of the root-of-trust in the non-security domain, so as to realize a function of the root-of-trust.

The inventor realizes that at present, concrete implementations of the firmware root-of-trust use the TEE technology, and operations, for example, switching between the security domain and the non-security domain, and data transfer, etc., are related to concrete processor architectures. Open-POWER is an open-source processor framework widely used in a field of server. Since a structure of the Open-POWER has not introduced the TEE technology, the Open-POWER may not copy and use solution-logics of the above implementations of the firmware root-of-trust, and there is a security risk in the processing-logic of the instruction of the root-of-trust.

SUMMARY

In order to solve the above one or more technical problems, technical solutions adopted by the present disclosure are as follows:

In a first aspect, a method for implementing a firmware root-of-trust is provided, including:
   setting a storage-medium for storing state-data of the firmware root-of-trust;
   integrating a processing-logic of an instruction of the firmware root-of-trust into a system-firmware;
   initializing the firmware root-of-trust, according to the state-data of the firmware root-of-trust and a startup-command of the firmware root-of-trust;
   creating a node of a device-tree for the firmware root-of-trust, for an operating-system to load a driver-program corresponding to the firmware root-of-trust; and
   registering an instruction-interface of the firmware root-of-trust into an interface-list.

Further, the initializing the firmware root-of-trust according to the state-data of the firmware root-of-trust and the startup-command of the firmware root-of-trust, includes:
   obtaining the state-data of the firmware root-of-trust from the storage-medium;
   configuring an operating-state of the firmware root-of-trust according to the state-data of the firmware root-of-trust;
   loading persistent-data stored in the firmware root-of-trust from a user; and
   executing the startup-command of the firmware root-of-trust, to initialize internal data of the firmware root-of-trust.

Further, the method for implementing the firmware root-of-trust further includes:
   executing the instruction of the firmware root-of-trust through the driver-program, and obtaining a processing-result of the instruction of the firmware root-of-trust.

Further, the executing the instruction of the firmware root-of-trust through the driver-program and obtaining the processing-result of the instruction of the firmware root-of-trust, includes:
   receiving an access-request for the firmware root-of-trust indicating that the instruction of the root-of-trust input from the user is received, through an operating-interface of the root-of-trust provided by the operating-system;
   storing current states of a stack and a register;
   calling the instruction-interface to process the instruction of the firmware root-of-trust;
   obtaining a processing-result of the instruction-interface;
   restoring the states of the stack and the register; and
   returning the processing-result of the instruction of the firmware root-of-trust.

Further, the calling the instruction-interface to process the instruction of the firmware root-of-trust, includes:
   obtaining the instruction of the firmware root-of-trust;
   executing the instruction of the firmware root-of-trust;
   determining whether the instruction of the firmware root-of-trust changes the state-data of the firmware root-of-trust;
   if yes, storing the state-data of the firmware root-of-trust; and
   returning an execution-result of the instruction of the firmware root-of-trust.

Further, before the executing the instruction of the firmware root-of-trust, the method further includes:
   determining whether the instruction of the firmware root-of-trust contains time-information; and
   if yes, calculating the time-information.

Further, the calculating the time-information, includes:
   obtaining a timer-base when counting starts; and
   obtaining a counting-result by calculating a difference-value of the counting.

Further, the creating the node of the device-tree for the firmware root-of-trust, includes: writing device-information into a node of a device-tree of the computer.

In a second aspect, a device for implementing a firmware root-of-trust is provided, including: a storage-medium module, an instruction-integration module, an initialization module, a node-creation module and an interface-registration module;

the storage-medium module is configured to store state-data of the firmware root-of-trust;

the instruction-integration module is configured to integrate a processing-logic of an instruction of the firmware root-of-trust into a system-firmware;

the initialization module is configured to initialize the firmware root-of-trust, according to the state-data of the firmware root-of-trust and a startup-command of the firmware root-of-trust;

the node-creation module is configured to create a node of a device-tree for the firmware root-of-trust, for an operating-system to load a driver-program corresponding to the firmware root-of-trust; and the interface-registration module is configured to register an instruction-interface of the firmware root-of-trust into an interface-list.

In a third aspect, a computer device is provided, including: a storage and one or more processors, wherein computer-readable instructions are stored in the storage and operable in the one or more processors, and when the one or more processors execute the computer-readable instructions, steps in the method for implementing the firmware root-of-trust provided by any one of the above embodiments are realized.

In a fourth aspect, the present disclosure provides one or more non-transitory computer-readable storage-media, storing computer-readable instructions, wherein, when the computer-readable instructions are executed by the one or more processors, the computer-readable instructions cause the one or more processors to execute steps in the method for implementing the firmware root-of-trust provided by any one of the above embodiments.

Details of one or more embodiments of the present disclosure are set forth in accompanying drawings and description below. Other features and advantages of the present disclosure will be apparent from the description, drawings, and claims.

BRIEF DESCRIPTION OF THE DRAWINGS

In order to more clearly illustrate the technical solutions in the embodiments of the present disclosure, the drawings that need to be used in description of the embodiments will be briefly introduced below. Apparently, the drawings in the following description are only some embodiments of the present disclosure. For those skilled in the art, other drawings may further be obtained based on these drawings without creative effort.

FIG. 5 is a schematic diagram of an apparatus for implementing a firmware root-of-trust, provided according to one or more embodiments of the present disclosure.

DETAILED DESCRIPTION OF THE EMBODIMENTS

Figure 1:
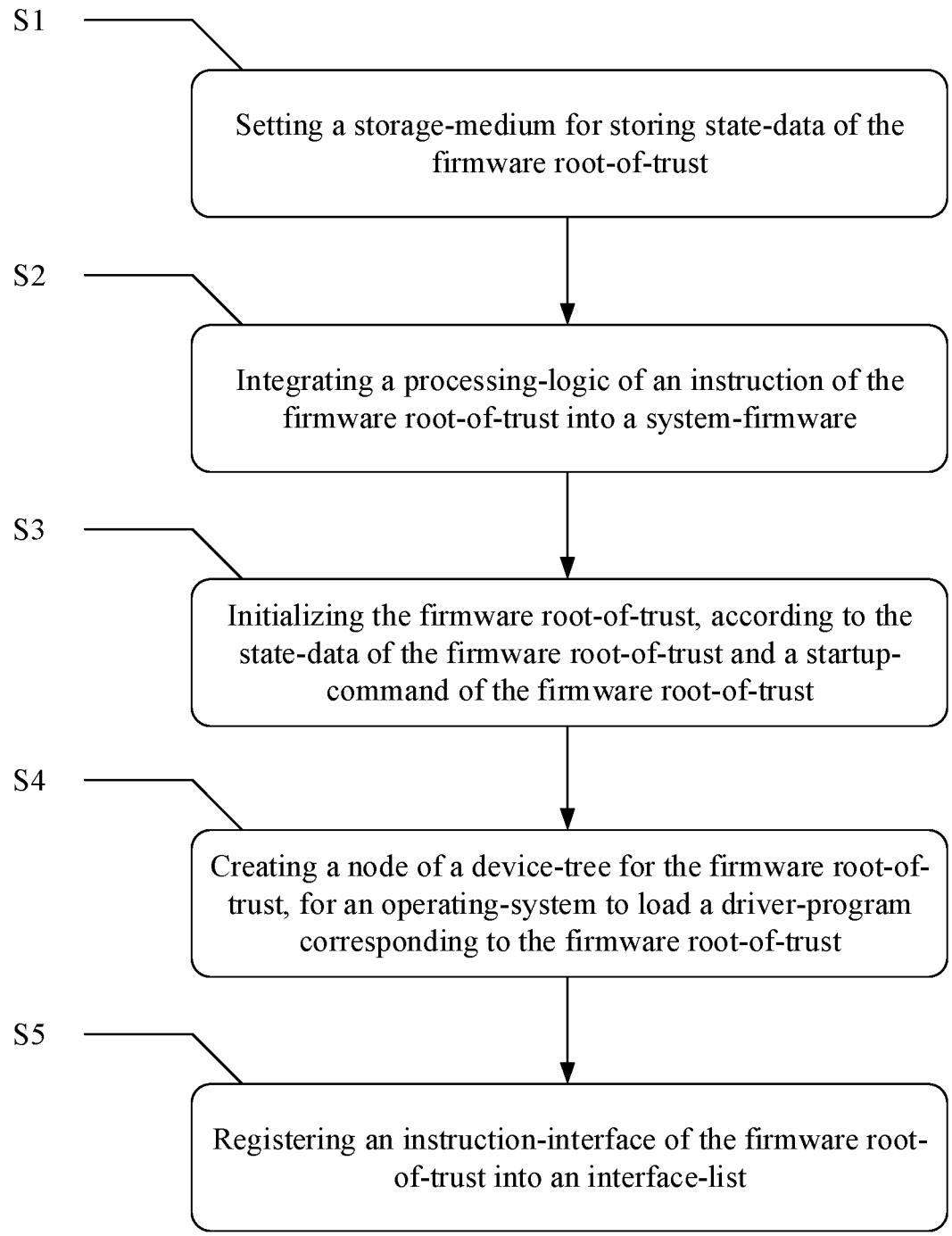
FIG. 1 is a schematic flowchart of a method for implementing a firmware root-of-trust, provided according to one or more embodiments of the present disclosure.

In order to make purposes, technical solutions and advantages of the present disclosure clearer, the technical solutions in the embodiments of the present disclosure will be clearly and completely described below in combination with the accompanying drawings in the embodiments of the present disclosure. Apparently, the described embodiments are only a part of embodiments of the present disclosure and not all embodiments. Based on the embodiments in the present disclosure, all other embodiments obtained by persons of ordinary skill in the art without creative efforts, fall within the protection scope of the present disclosure.

Unless otherwise defined, technical terms or scientific terms used in the present disclosure shall have usual meanings understood by those skilled in the art to which the present disclosure belongs. "First", "second" and similar words used in the present disclosure do not indicate any order, quantity or importance, but are only used for distinguishing different components. Likewise, words like "a", "an" and "the" do not denote a limitation of quantity, but mean that there is at least one. Numbers in the drawings of the specification only indicate distinction of respective functional components or modules, and do not indicate logical relationships among the components or modules. "Including", "comprising" and similar words mean that elements or items appearing before the word include the elements or items listed after the word and their equivalents, without excluding other elements or items. Words, for example, "connected" and "connecting" are not limited to physical or mechanical connections, but may include electrical connections, whether direct or indirect. "Up", "down", "left", "right" and so on are only used for indicating relative positional relationships. When an absolute position of a described object changes, a relative positional relationship may change accordingly.

Hereinafter, respective embodiments according to the present disclosure will be described in detail with reference to the accompanying drawings. It shall be noted that, in the drawings, the same reference numerals are assigned to components substantially having the same or similar structures and functions, and repeated descriptions about them will be omitted.

In existing technology, since an OpenPOWER processor architecture without a physical root-of-trust does not support the TEE (Trusted Execution Environment) technology, it may not copy and use the solution-logics of implementations of the firmware root-of-trust under the TEE technology, does not have the operations, for example, switching between the security domain and the non-security domain, and data transfer, etc., and has a potential risk of data security. An embodiment of the present disclosure discloses a method for implementing a firmware root-of-trust applied to the Open-POWER processor architecture, and a concrete technical solution is as follows:

In an embodiment, as shown in FIG. 1, a method for implementing a firmware root-of-trust, includes:

Step S1: setting a storage-medium for storing state-data of the firmware root-of-trust;

Step S2: integrating a processing-logic of an instruction of the firmware root-of-trust into a system-firmware;

Step S3: initializing the firmware root-of-trust, according to the state-data of the firmware root-of-trust and a startup-command of the firmware root-of-trust;

Step S4: creating a node of a device-tree for the firmware root-of-trust, for an operating-system to load a driver-program corresponding to the firmware root-of-trust; and Step S5: registering an instruction-interface of the firmware root-of-trust into an interface-list.

Step S1: setting the storage-medium for storing the state-data of the firmware root-of-trust.

A design of a mainboard of a system affects a reading-and-writing manner of the storage-medium. In some scenarios, data in a storage-chip may be directly obtained, and in some scenarios, other components are required to assist in reading the data.

In an embodiment, a Flash-chip is used as a storage-medium for the state-data of the root-of-trust. A concrete implementation is: adding a separate Flash-chip into a mainboard of a computer as a storage-space for the state-data of the firmware root-of-trust. After the computer is powered on, the state-data of the root-of-trust in the Flash-chip may be obtained directly. The Flash-chip is a non-volatile-memory-chip that may be used for storing the state-data of the root-of-trust.

Step S2: integrating the processing-logic of the instruction of the firmware root-of-trust into the system-firmware.

OpenPOWER PNOR is the system-firmware in an Open-POWER system, which is used for initializing a hardware of the computer, building an operating-environment of the operating-system, booting the operating-system, and so on.

In an embodiment, the processing-logic of the instruction of the root-of-trust is integrated into the OpenPOWER PNOR, for initializing the firmware root-of-trust, so that the firmware root-of-trust may provide a function the same as that of a hardware root-of-trust when the firmware root-of-trust runs on the computer without the hardware root-of-trust.

Step S3: initializing the firmware root-of-trust, according to the state-data of the firmware root-of-trust and the startup-command of the firmware root-of-trust.

Figure 2:
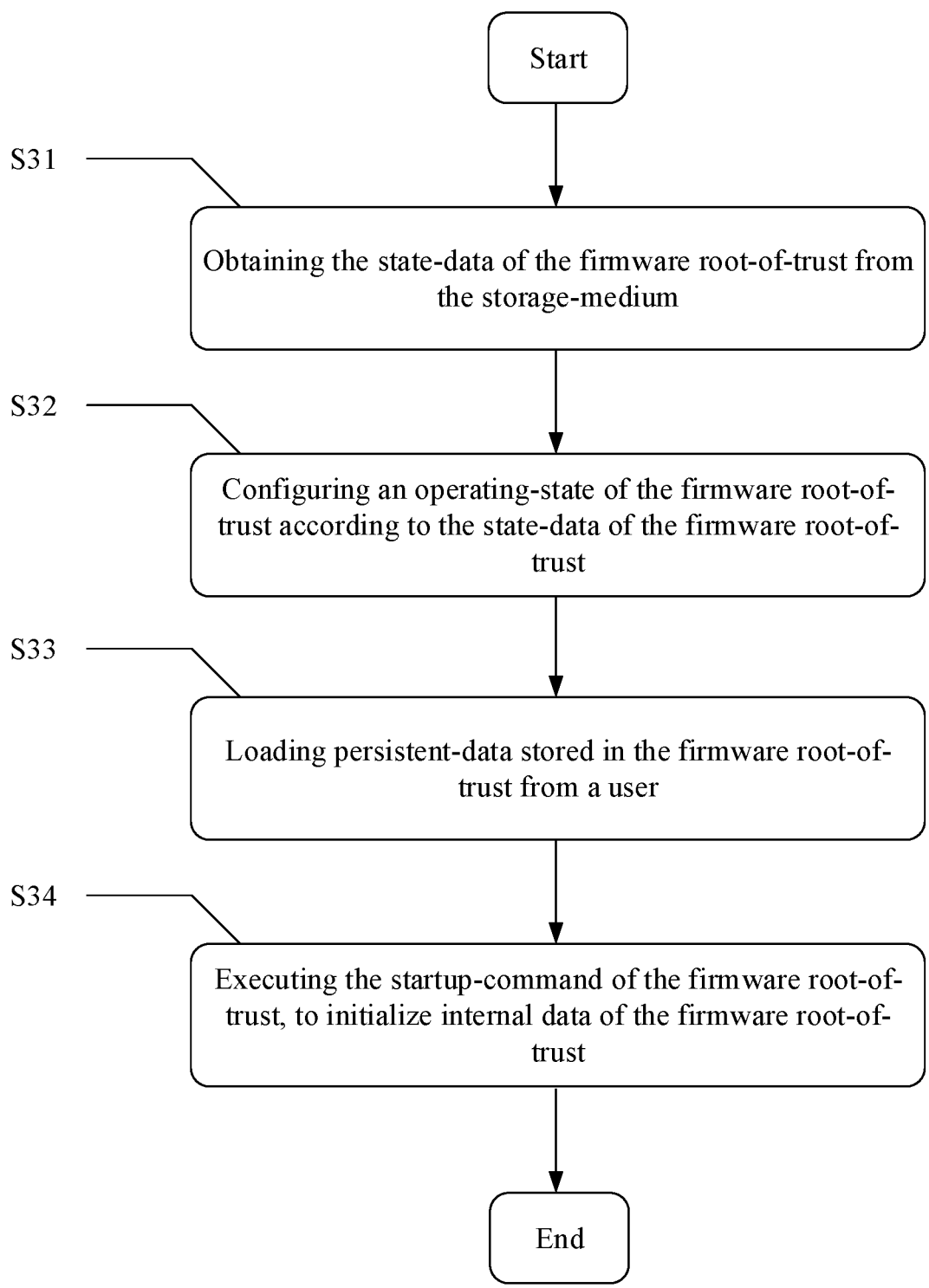
FIG. 2 is a schematic diagram of initialization of a firmware root-of-trust, provided according to one or more embodiments of the present disclosure.

A concrete implementation is as shown in FIG. 2, including:

Step S31: obtaining the state-data of the firmware root-of-trust from the storage-medium.

Concretely, the state-data is stored in the Flash-chip, and the state-data in the chip is obtained through a command of reading the Flash-chip.

In order to ensure security of the state-data of the firmware root-of-trust, cryptographic mechanisms may be adopted, for example, encryption, and integrity verification, etc., may be adopted to ensure the security of data in the Flash-chip. If a protection-mechanism for data is adopted, corresponding mechanisms shall be added when reading-and-writing the data, for example, decrypting a ciphertext when reading the data, and encrypting a plaintext when storing the data.

Step S32: configuring an operating-state of the firmware root-of-trust according to the state-data of the firmware root-of-trust.

Step S33: loading persistent-data stored in the firmware root-of-trust from a user.

Concretely, the state-data of the firmware root-of-trust is persistently stored in the Flash-chip, and each time the firmware root-of-trust is instantiated, the data needs to be read to configure the firmware root-of-trust. At the same time, the root-of-trust provides a function of persistent storage, and the user-defined persistent-data shall be loaded into the firmware root-of-trust as well when the firmware root-of-trust is instantiated.

Step S34: executing the startup-command of the firmware root-of-trust, to initialize internal data of the firmware root-of-trust.

Through this step, the initialization of the internal data of the root-of-trust may be completed. After a hardware root-of-trust is powered on, a concrete instruction is required to trigger initialization of internal logic-data of the root-of-trust, for example, the concrete instruction is, a TPM2_Startup2 instruction in a TPM2.0 chip, or a TCM_Startup instruction in a TCM chip, etc. The firmware root-of-trust is a simulation of the hardware root-of-trust. In the firmware root-of-trust, it is necessary to simulate initialization-instructions of the above hardware root-of-trust as well, to complete the initialization of the internal data the firmware root-of-trust.

Step S4: creating the node of the device-tree for the firmware root-of-trust, for the operating-system to load the driver-program corresponding to the firmware root-of-trust.

Among them, creating the node of the device-tree for the firmware root-of-trust, includes: writing device-information into a node of a device-tree of the computer.

At present, the device-information of a hardware initialized by the system-firmware is notified to the operating-system in a form of the device-tree. For the operating-system, the firmware root-of-trust is a device as well, so the system-firmware needs to create the node of the device-tree for the firmware root-of-trust to notify the operating-system to load the corresponding driver-program. After the initialization of a firmware root-of-trust module is completed, the device-information thereof is written into the node of the device-tree, then subsequent components may determine whether there is a firmware root-of-trust according to information of the node. Finally, an interface of the processing-logic of the instruction of the firmware root-of-trust is registered as an OPAL API for the subsequent components to use.

Step S5: registering the instruction-interface of the firmware root-of-trust into the interface-list.

The state-data of the firmware root-of-trust is stored in the Flash-chip. In order to ensure the security of the data in the chip, an access-authority of the chip shall be restricted to ensure that only the system-firmware may read-and-write the chip. Therefore, when the system is designed, the system-firmware shall ensure that information of I/O interface of the chip shall not be exposed to the operating-system, and the operating-system and application-programs may change the state-data of the firmware root-of-trust only through an interface of the firmware root-of-trust, so as to prevent malicious programs in the system from tampering with the state-data of the firmware root-of-trust.

The firmware root-of-trust receives instructions and returns execution-results for the instructions through a fixed interface. The OPAL API is an OPAL-application-program-interface. OPAL (OpenPOWER Abstraction Layer) is one of components of the OpenPOWER PNOR, used for initializing the hardware of the computer, initializing the operating-environment of the operating-system, booting the operating-system, and providing runtime-services for the operating-system. OPAL provides an interface for the runtime-services to the operating-system. All information of the OPAL API will be stored in a list, OPAL API Table, for use by other calling objects. An interface for processing instructions, of the firmware root-of-trust, needs to be registered into the OPAL API Table, then the subsequent components may send the instructions to, or receive the instructions from, the firmware root-of-trust by indexing the OPAL API Table. The driver-program of the firmware root-of-trust is integrated in the operating-system. Different from that in the hardware root-of-trust, sending instructions of the root-of-trust to or receiving the instructions of the root-of-trust from the physical root-of-trust, is through reading-and-writing a register of the physical root-of-trust, the driver-program of the present disclosure sends the instructions of the root-of-trust to or receives the instructions of the root-of-trust from the firmware root-of-trust, by calling the interface opened by the OPAL API.

In another embodiment, an implementation of the firmware root-of-trust further includes:

Step S6: executing the instruction of the firmware root-of-trust through the driver-program, and obtaining a processing-result of the instruction of the firmware root-of-trust.

Figure 3:
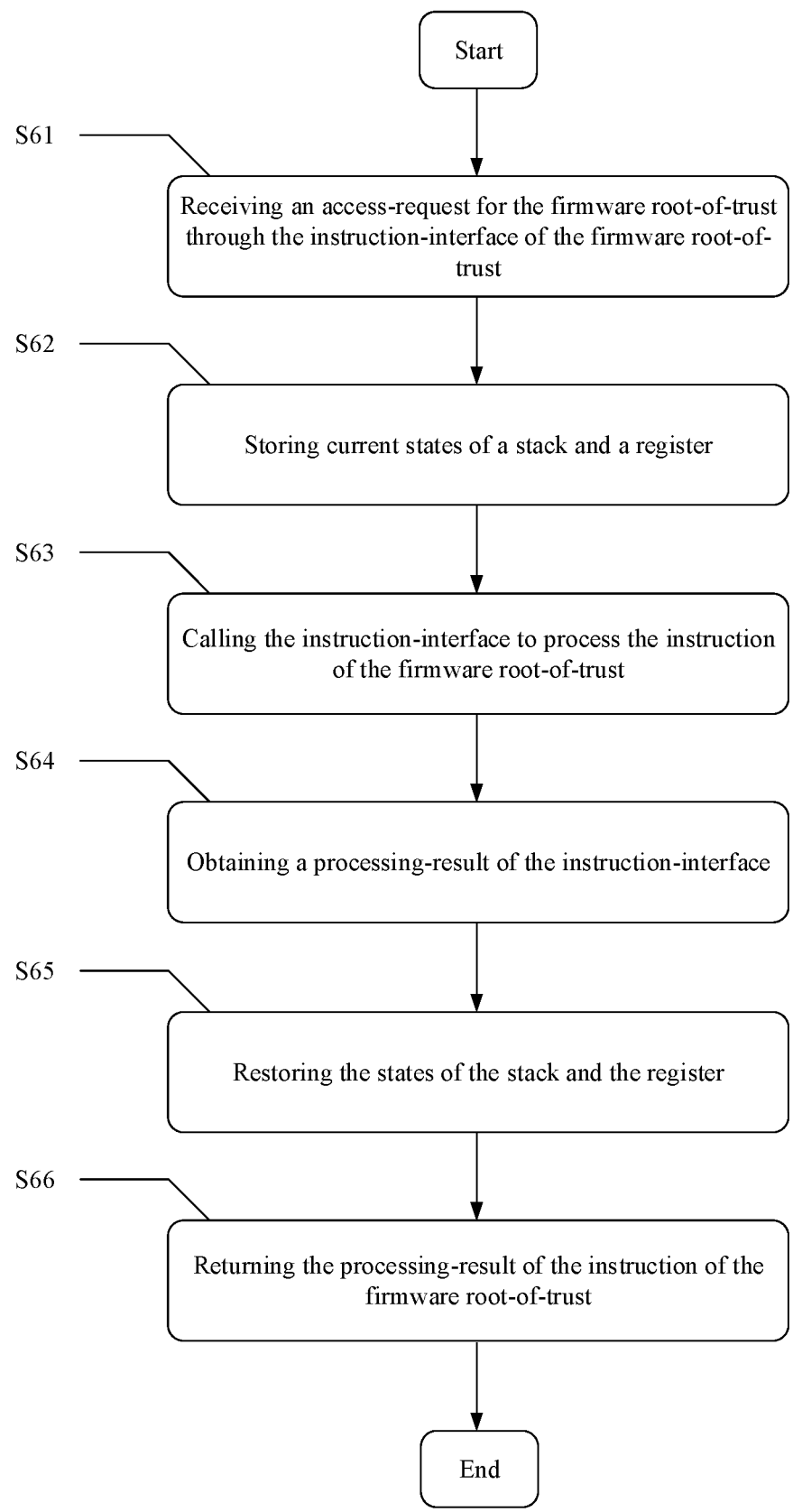
FIG. 3 is a schematic flowchart of executing instructions of a firmware root-of-trust through a driver-program, provided according to one or more embodiments of the present disclosure.

The firmware root-of-trust provides services through the OPAL API. The operating-system may not directly access a memory of the OPAL API, and needs to access an entry-address of the OPAL API to call the OPAL API. A concrete implementation is as shown in FIG. 3, including:

Step S61: receiving an access-request for the firmware root-of-trust, which indicates that the instruction of the root-of-trust input from the user is received, through an operating-interface of the root-of-trust provided by the operating-system.

The operating-system needs to shield the user from a difference between the physical root-of-trust and the firmware root-of-trust, that is, there is no difference between the operating-interface of the root-of-trust provided by the operating-system and that of the physical root-of-trust, to the user. The user may transmit the instruction of the root-of-trust to the operating-system through the operating-interface provided by the operating-system. Corresponding to this implementation, the firmware root-of-trust needs to obtain the instruction and process the instruction, then it may return a result thereof to the user and provide a corresponding function to the user.

Step S62: storing current states of a stack and a register.

After the operating-system receives the instruction of the root-of-trust sent from the user, it needs to store the current states, and then calls the OPAL API. The operating-system stores the states of a memory-stack, a processor-register, etc., at a current runtime, so that it may restore a processing-state after calling the firmware root-of-trust.

Step S63: calling the instruction-interface to process the instruction of the firmware root-of-trust.

Figure 4:
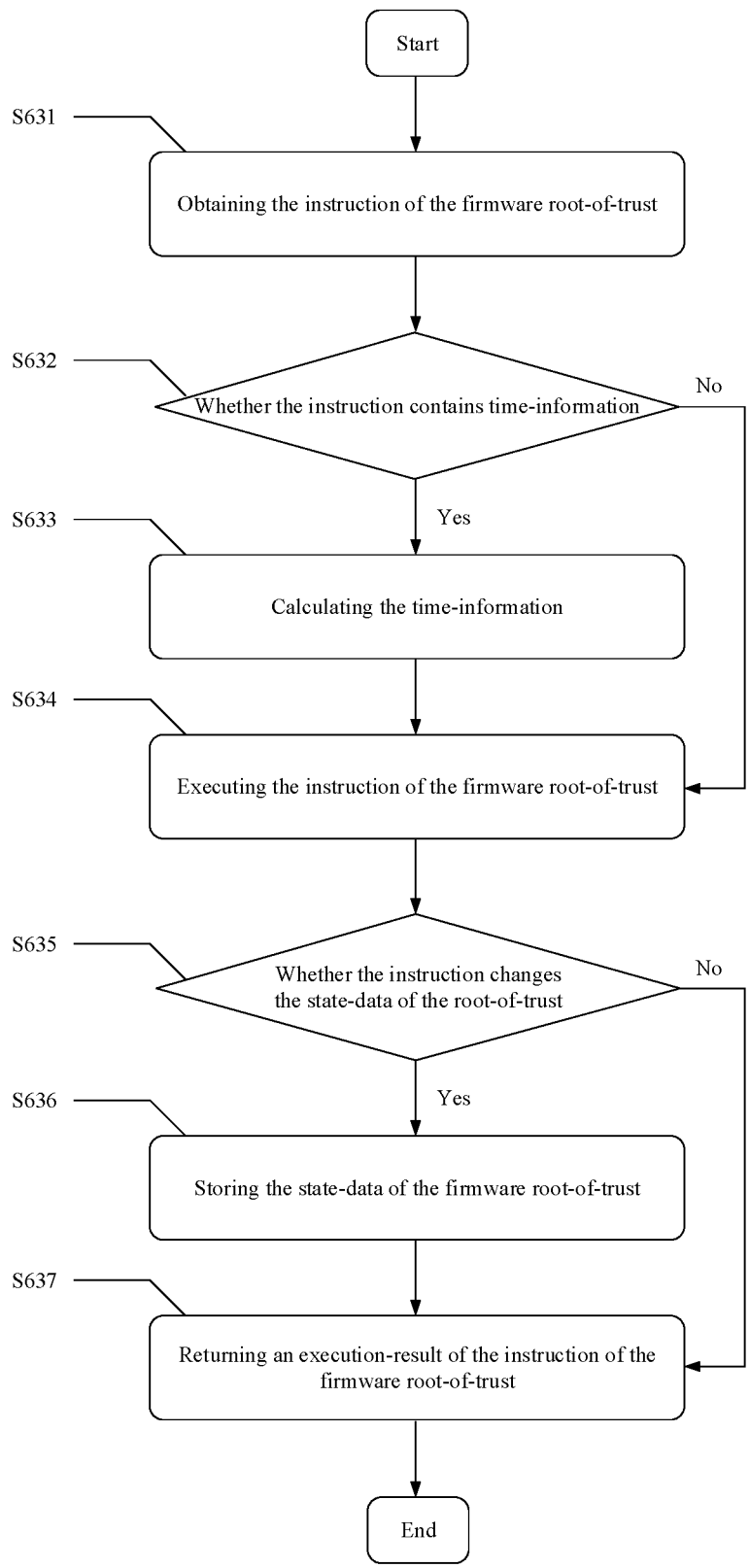
FIG. 4 is a schematic flowchart of processing instructions of a firmware root-of-trust by calling an instruction-interface, provided according to one or more embodiments of the present disclosure.

By calling the OPAL API, the instruction of the root-of-trust input from the user is transferred to the instruction-interface of the firmware root-of-trust. A concrete implementation is as shown in FIG. 4, including: Step S631: obtaining the instruction of the firmware root-of-trust.

The instruction of the root-of-trust transferred by an external component through the OPAL API is obtained.

Step S632: determining whether the instruction of the firmware root-of-trust contains time-information.

Among commands provided by the root-of-trust, a part of functions require a counter-function, for example, an instruction for a deadlock-counter, and these counter-information is only used inside the root-of-trust.

Step S633: if yes, calculating the time-information; that is, calculating the time-information in response to that the instruction of the firmware root-of-trust contains the time-information.

The above calculating the time-information, includes:

Step S6331: obtaining a timer-base when counting starts.

Step S6332: obtaining a counting-result by calculating a difference-value of the counting.

There is no counter-information in standard commands of the root-of-trust. However, technical characteristics of a platform of a server may be adopted, for example, a timer-mechanism of OPAL may be adopted. The timer-mechanism obtains a count-value through a counter-instruction (mftb) of a POWER CPU. The timer-base is obtained when the counting of the root-of-trust starts. When a subsequent instruction is executed, if the time-information needs to be obtained, the counting-result is obtained by calculating the difference-value of the counting. Taking a counting of lock-time for deadlocking the root-of-trust as an example, when a maximum waiting-time is initially set, the count-value of the CPU is synchronously obtained as the timer-base. Subsequently, when the root-of-trust is determined whether the maximum waiting-time of deadlocking is exceeded, it only needs to subtract the count-value at a time of the determination, by the timer-base, which may determine whether the deadlocking is in effect. Since the counter of the POWER CPU is continuously and automatically incremented, and may not be changed or artificially suspended, reliability of the counter may be guaranteed.

Step S634: executing the instruction of the firmware root-of-trust.

The processing-logic of the instruction of the root-of-trust is executed, to complete an instruction-operation.

Step S635: determining whether the instruction of the firmware root-of-trust changes the state-data of the firmware root-of-trust.

Step S636: if yes, storing the state-data of the firmware root-of-trust; that is, in response to the instruction of the firmware root-of-trust, changing the state-data of the firmware root-of-trust, and storing the state-data of the firmware root-of-trust.

Some instructions in the root-of-trust will change a state of the root-of-trust, and a result of execution of the instruction only changes the state-data at a runtime in the memory. In order to ensure consistency of the state-data of the firmware root-of-trust after the computer is restarted, when the processing-logic of the instruction of the root-of-trust changes the state-data of the root-of-trust, it is necessary to store the state-data of the firmware root-of-trust into the Flash-chip in real time, to prevent data loss. At the same time, the root-of-trust provides a function for persistently storing data. When the instruction changes the data in a persistent storage-area, the data shall be stored in real time as well. The state-data of the firmware root-of-trust is stored into the Flash-chip through a command of writing the Flash-chip.

Step S637: returning an execution-result of the instruction of the firmware root-of-trust. The processing-result of the instruction is returned to a caller for the OPAL API through the OPAL API.

The processing-logic of some instructions in the root-of-trust involves cryptographic functions. Some cryptographic-function-engines are built in the OpenPOWER processor, and the cryptographic-function-engines may be called to speed up an instruction-processing process.

Step S64: obtaining a processing-result of the instruction-interface.

After the firmware root-of-trust processes the instruction, the operating-system may obtain the processing-result of the instruction through the OPAL API.

Step S65: restoring the states of the stack and the register.

The stored states of the memory-stack and the processor-register is restored to the states before the calling of the OPAL API, so that the operating-system and a user-program may continue to be executed.

Step S66: returning the processing-result of the instruction of the firmware root-of-trust.

The processing-result of the firmware root-of-trust is returned to the user-program through the interface.

The beneficial effects brought by the technical solutions provided by the embodiments of the present disclosure are:

1. When a platform of the OpenPOWER is not equipped with a chip of the root-of-trust, it may provide a function of the root-of-trust to the operating-system, to realize trusted computing as well.

2. The firmware root-of-trust may run in a memory-space separate from the operating-system, and ordinary programs may not tamper with the data therein, which protects the security of the data.

3. By introducing clock-resources and storage-resources, it is ensured that the firmware root-of-trust may provide the function the same as that of the physical root-of-trust, and the difference between the physical root-of-trust and the firmware root-of-trust is shielded.

In another embodiment, as shown in FIG. 5, an apparatus for implementing the firmware root-of-trust, includes:

a storage-medium module 1, an instruction-integration module 2, an initialization module 3, a node-creation module 4 and an interface-registration module 5.

The storage-medium module 1 is configured to store the state-data of the firmware root-of-trust.

The instruction-integration module 2 is configured to integrate the processing-logic of the instruction of the firmware root-of-trust into the system-firmware.

The initialization module 3 is configured to initialize the firmware root-of-trust, according to the state-data of the firmware root-of-trust and the startup-command of the firmware root-of-trust.

The node-creation module 4 is configured to create the node of the device-tree for the firmware root-of-trust, for an operating-system to load the driver-program corresponding to the firmware root-of-trust.

The interface-registration module 5 is configured to register the instruction-interface of the firmware root-of-trust into the interface-list.

Figure 6:
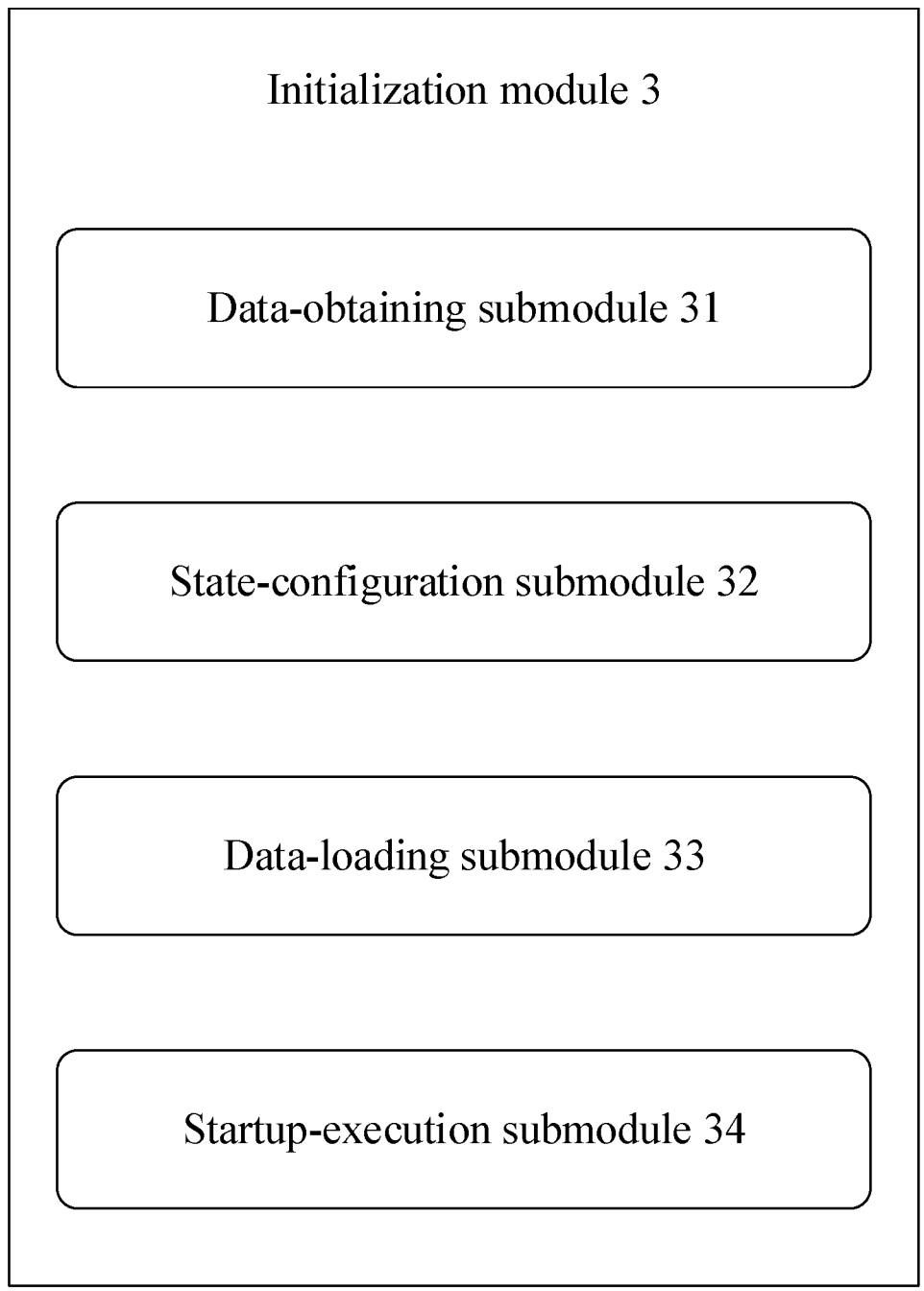
FIG. 6 is a schematic diagram of an initialization module, provided according to one or more embodiments of the present disclosure.

Among them, as shown in FIG. 6, the initialization module 3 includes: a data-obtaining submodule 31, a state-configuration submodule 32, a data-loading submodule 33 and a startup-execution submodule 34.

The data acquisition submodule 31 is configured to obtain the state-data of the firmware root-of-trust from the storage-medium.

The state-configuration submodule 32 is configured to configure the operating-state of the firmware root-of-trust according to the state-data of the firmware root-of-trust.

The data-loading submodule 33 is configured to load the persistent-data stored in the firmware root-of-trust from the user.

The start execution submodule 34 is configured to execute the startup-command of the firmware root-of-trust, to initialize the internal data of the firmware root-of-trust.

Figure 7:
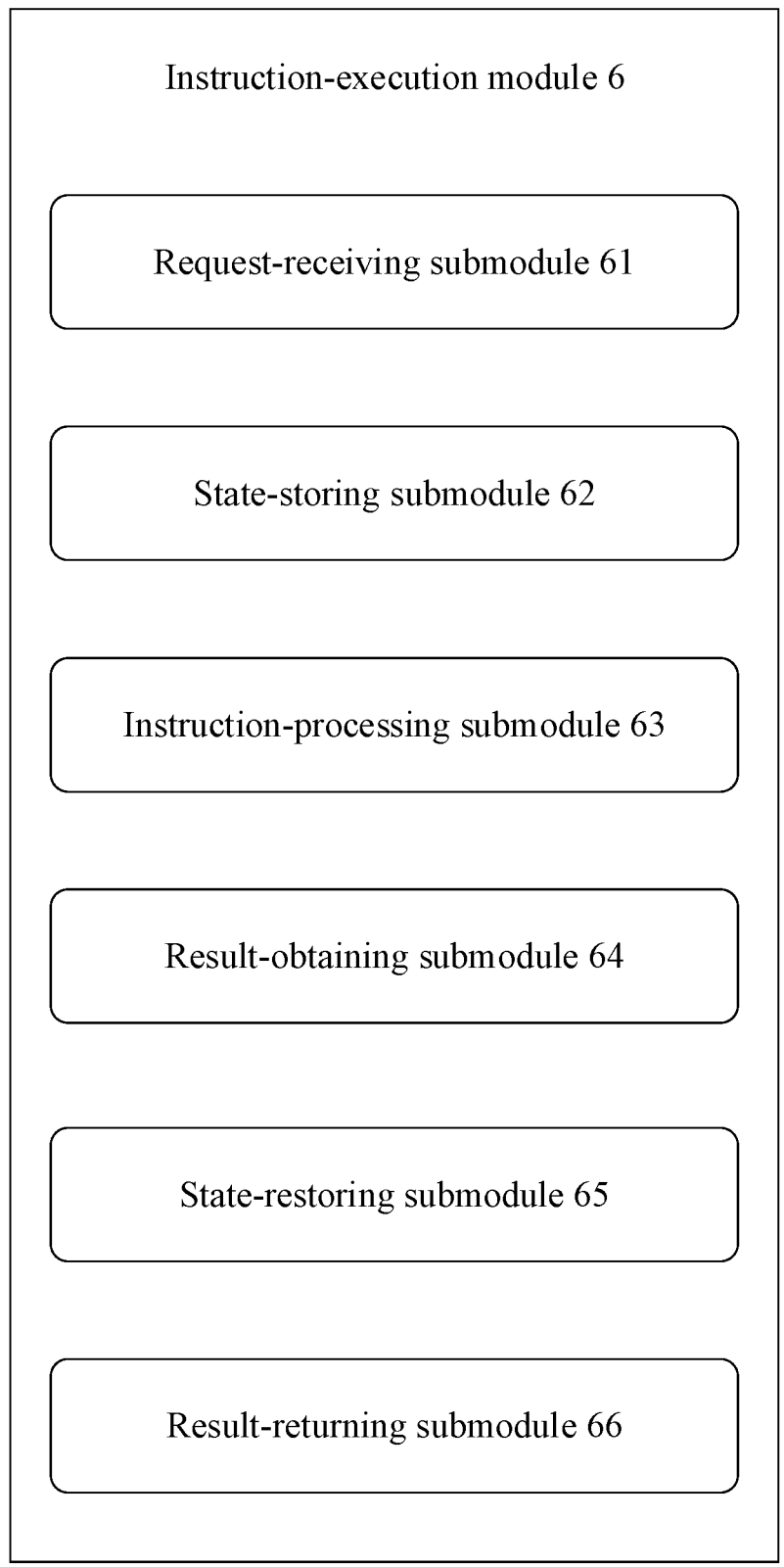
FIG. 7 is a schematic diagram of an instruction-execution module, provided according to one or more embodiments of the present disclosure.

In another embodiment, the apparatus for implementing the firmware root-of-trust further includes: an instruction-execution module 6, configured to execute the instruction of the firmware root-of-trust through the driver-program, and obtain the processing-result of the instruction of the firmware root-of-trust. As shown in FIG. 7, the instruction-execution module 6 concretely includes: a request-receiving submodule 61, a state-storing submodule 62, an instruction-processing submodule 63, a result-obtaining submodule 64, a state-restoring submodule 65 and a result-returning submodule 66.

The request-receiving submodule 61 is configured to receive an access-request for the firmware root-of-trust, which indicates that the instruction of the root-of-trust input from the user is received, through an operating-interface of the root-of-trust provided by the operating-system.

The state-storing submodule 62 is configured to store the current states of the stack and the register.

The instruction-processing submodule 63 is configured to call the instruction-interface to process the instruction of the firmware root-of-trust.

The result-obtaining submodule 64 is configured to obtain the processing-result of the instruction-interface.

The state-restoring submodule 65 is configured to restore the states of the stack and the register.

The result-returning submodule 66 is configured to return the processing-result of the instruction of the firmware root-of-trust.

Figure 8:
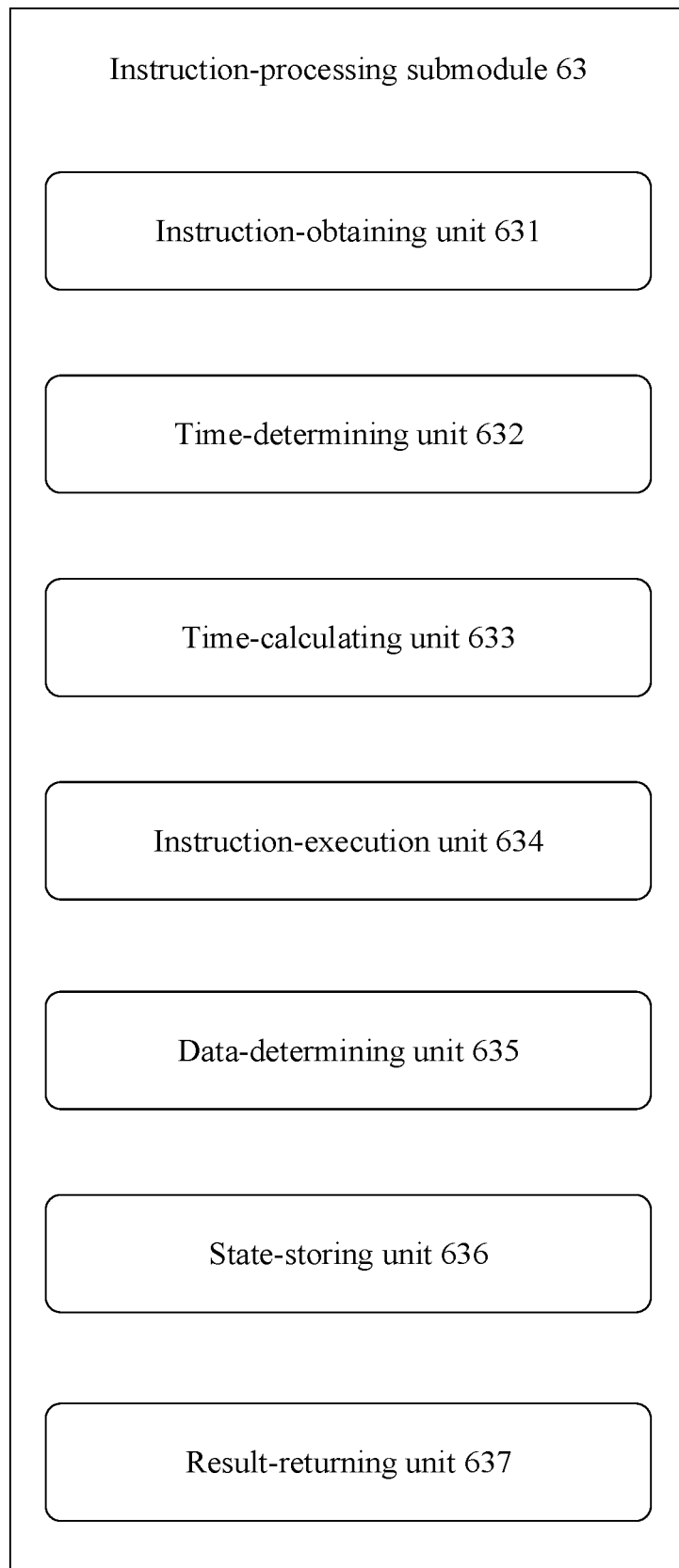
FIG. 8 is a schematic diagram of an instruction-processing submodule, provided according to one or more embodiments of the present disclosure.

As shown in FIG. 8, the instruction-processing submodule 63 concretely further includes: an instruction-obtaining unit 631, a time-determining unit 632, a time-calculating unit 633, an instruction-execution unit 634, a data-determining unit 635, a state-storing unit 636 and a result-returning unit 637.

The instruction-obtaining unit 631 is configured to obtain the instruction of the firmware root-of-trust.

The time-determining unit 632 is configured to determine whether the instruction of the firmware root-of-trust contains the time-information.

The time-calculating unit 633 is configured to calculate the time-information.

The instruction-execution unit 634 is configured to execute the instruction of the firmware root-of-trust.

The data-determining unit 635 is configured to determine whether the instruction of the firmware root-of-trust changes the state-data of the firmware root-of-trust.

The state-storing unit 636 is configured to store the state-data of the firmware root-of-trust.

The result-returning unit 637 is configured to return the execution-result of the instruction of the firmware root-of-trust.

In another embodiment, a computer device is provided, including a storage and one or more processors, wherein computer-readable instructions are stored in the storage and operable in the processors, and when the one or more processors execute the computer-readable instructions, the steps in the method for implementing the firmware root-of-trust provided by any one of the above embodiments may be realized.

Figure 9:
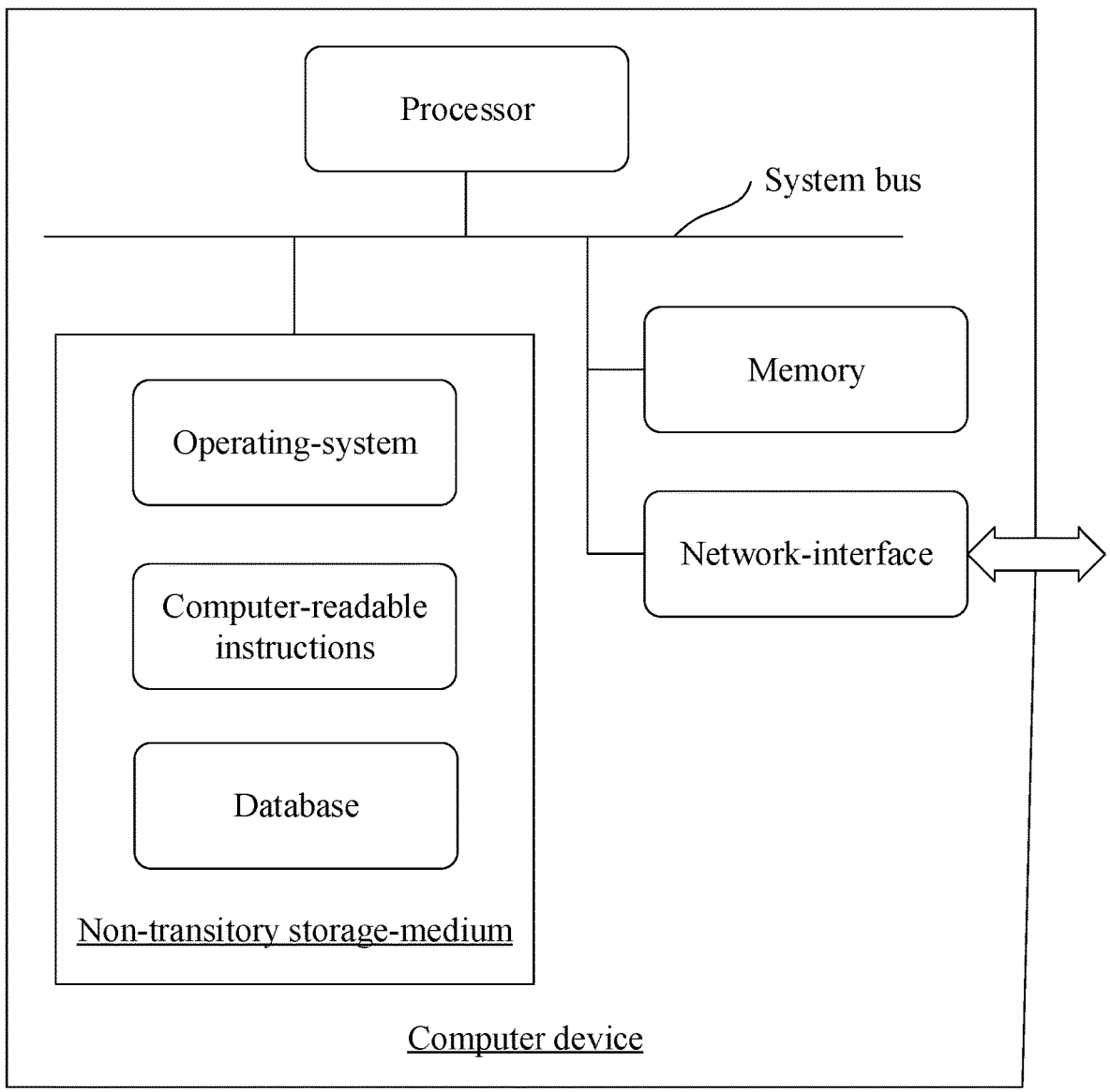
FIG. 9 is an internal structural diagram of a computer device, provided according to one or more embodiments of the present disclosure.

The embodiment further provides another computer device, an internal structure diagram of which may be as shown in FIG. 9. The computer device may be a server, and include a processor, a storage, a network-interface and a database connected by a system bus. Among them, the processor of the computer device is configured to provide calculation and control capabilities. The storage of the computer device includes a non-volatile storage-medium and a memory. The non-volatile storage-medium stores the operating-system, the computer-readable instructions and the database. The memory provides an environment for execution of the operating-system and the computer-readable instructions in the non-volatile storage-medium. The database of the computer device is configured to store the data, for example, the state-data of the firmware root-of-trust. The network-interface of the computer device is configured to communicate with an external terminal via a network-connection. When the computer-readable instructions are executed by the processor, the method for implementing the firmware root-of-trust may be realized.

In another embodiment, one or more non-transitory computer-readable storage-media storing the computer-readable instructions are provided, and when the computer-readable instructions are executed by one or more processors, the computer-readable instructions cause the one or more processors to execute the steps in the method for implementing the firmware root-of-trust provided by any one of the above embodiments.

Every optional technical solution above may be combined in any way to form optional embodiments of the present disclosure, which will not be repeated here.

In particular, according to the embodiments of the present disclosure, the processes described above with reference to the flowcharts may be implemented as computer-software-programs. For example, the embodiments of the present disclosure include a computer-readable instruction-product, which includes the computer-readable instructions loaded on a computer-readable medium, wherein the computer-readable instructions include program-codes for executing the methods shown in the flowcharts. In such an embodiment, the computer-readable instructions may be downloaded and installed from a network via a communication means, or installed from the storage, or installed from a ROM. When the computer-readable instructions are executed by an external processor, the above functions defined in the methods of the embodiments of the present disclosure are performed.

It shall be noted that the computer-readable medium in the embodiments of the present disclosure may be a computer-readable signal-medium or the computer-readable storage-medium, or any combination of the above two. The computer-readable storage-medium may be, for example, but not limited to, a system, an apparatus, or a device of electricity, magnetism, optics, electromagnetism, infrared, or semiconductor, or any combination thereof. More concrete examples of the computer-readable storage-medium may include, but not limited to, an electrical connection with one or more wires, a portable computer-disk, a hard disk, a random-access memory (RAM), a read-only memory (ROM), an erasable programmable read-only memory (EPROM or flash memory), an optical fiber, a portable compact-disk read-only memory (CD-ROM), an optical storage-device, a magnetic storage-device, or any suitable combination of the above. In the embodiments of the present disclosure, the computer-readable storage-medium may be any tangible medium containing or storing the program, and the program may be used by or in combination with an instruction-execution system, apparatus, or device. However, in the embodiments of the present disclosure, the computer-readable signal-medium may include a data-signal propagated in a baseband or as a part of a carrier-wave, in which computer-readable program-codes are carried. Such propagated data-signal may take many forms, including but not limited to an electro-magnetic signal, an optical signal, or any suitable combination of the foregoing. The computer-readable signal-medium may be any computer-readable medium other than the computer-readable storage-medium as well, which may send, propagate, or transmit the program for use by or in combination with the instruction-execution system, apparatus, or device. The program-codes contained on the computer-readable medium may be transmitted by any appropriate medium, including but not limited to: an electric wire, an optical cable, a RF (Radio Frequency), etc., or any suitable combination of the above.

The above computer-readable medium may be contained in the above server; or may be presented separately, without being assembled into the server. The above computer-readable medium carries one or more programs, and when the above one or more programs are executed by the server, the server: in response to detecting that a peripheral-mode of the terminal is not activated, obtains a frame-rate applied on the terminal; when the frame-rate meets an off-screen condition, determines whether the user is obtaining screen-information of the terminal; and in response to a determination-result that the user has not obtained the screen-information of the terminal, controls a screen to enter an immediate-dimming mode.

Computer-readable instruction-codes for performing operations of embodiments of the present disclosure may be written in one or more programming languages or combinations thereof, including object-oriented programming languages, for example, Java, Smalltalk, C++, and conventional procedural programming languages as well, for example, "C" language or similar programming languages. The program-codes may execute entirely on the computer of the user, partly on the computer of the user, as a stand-alone software-package, partly on the computer of the user and partly on a remote computer, or entirely on the remote computer or server. In a case involving the remote computer, the remote computer may be connected to the computer of the user through any kind of network, including a local area network (LAN) or a wide area network (WAN), or may be connected to an external computer (for example, through an Internet-connection by utilizing an Internet-service-provider).

The respective embodiments in the specification are described in a progressive manner, the same and similar parts of the respective embodiments may be referred to each other, and each embodiment focuses on a difference from other embodiments. In particular, for the systems or the embodiments of the systems, since they are basically similar to the embodiments of the methods, the descriptions thereof are relatively simple, and for related parts, please refer to the parts of the descriptions of t the embodiments of the methods. The systems and the embodiments of the systems described above are only illustrative, wherein the units described as separate components may be or may not be physically separated, and the components shown as units may be or may not be physical units, that is, it may be located in one place, or it may be distributed to a plurality of network-elements. A part of or all of the modules may be selected according to actual needs to achieve the purpose of the solutions of the embodiments. It may be understood and implemented by those skilled in the art without creative effort.

The technical solutions provided by the present disclosure have been introduced in detail above, and concrete examples have been used in the specification to illustrate principles and implementations of the present disclosure. The description of the above embodiments is only used for helping understand the methods and core ideas of the present disclosure. At the same time, for those skilled in the art, there will be changes in concrete implementations and application-scopes based on the idea of the present disclosure. To sum up, the contents of the specification shall not be understood as limitation to the present disclosure.

The above descriptions are only preferred embodiments of the present disclosure, and are not intended to limit the present disclosure. Any modifications, equivalent replacements, improvements, etc., made within the spirit and principles of the present disclosure shall be included within a protection-range of the present disclosure.

The invention claimed is:

1. A method for implementing a firmware root-of-trust, wherein the method comprises: setting a storage-medium for storing state-data of the firmware root-of-trust; integrating a processing-logic of an instruction of the firmware root-of-trust into a system-firmware; initializing the firmware root-of-trust, according to the state-data of the firmware root-of-trust and a startup-command of the firmware root-of-trust; creating a node of a device-tree for the firmware root-of-trust, for an operating-system to load a driver-program corresponding to the firmware root-of-trust; and registering an instruction-interface of the firmware root-of-trust into an interface-list; and wherein the initializing the firmware root-of-trust according to the state-data of the firmware root-of-trust and the startup-command of the firmware root-of-trust, comprises: obtaining the state-data of the firmware root-of-trust from the storage-medium; configuring an operating-state of the firmware root-of-trust according to the state-data of the firmware root-of-trust; loading persistent-data stored in the firmware root-of-trust from a user; and executing the startup-command of the firmware root-of-trust, to initialize internal data of the firmware root-of-trust;

wherein the method further comprises: executing the instruction of the firmware root-of-trust through the driver-program, and obtaining a processing-result of the instruction of the firmware root-of-trust; and wherein the executing the instruction of the firmware root-of-trust through the driver-program and obtaining the processing-result of the instruction of the firmware root-of-trust, comprises: receiving an access-request for the firmware root-of-trust indicating that the instruction of the firmware root-of-trust input from the user is received, through an operating-interface of the firmware root-of-trust provided by the operating-system; storing current states of a stack and a register; calling the instruction-interface to process the instruction of the firmware root-of-trust; obtaining a processing-result of the instruction-interface; restoring states of the stack and the register; and returning the processing-result of the instruction of the firmware root-of-trust.

2. The method for implementing the firmware root-of-trust according to claim 1, wherein the calling the instruction-interface to process the instruction of the firmware root-of-trust, comprises: obtaining the instruction of the firmware root-of-trust; executing the instruction of the firmware root-of-trust; in response to the instruction of the firmware root-of-trust changing the state-data of the firmware root-of-trust, storing the state-data of the firmware root-of-trust; and returning an execution-result of the instruction of the firmware root-of-trust.

3. The method for implementing the firmware root-of-trust according to claim 2, wherein, before the executing the instruction of the firmware root-of-trust, the method further comprises: in response to the instruction of the firmware root-of-trust containing time-information, calculating the time-information.

4. The method for implementing the firmware root-of-trust according to claim 3, wherein the calculating the time-information, comprises: obtaining a timer-base when counting starts; and obtaining a counting-result by calculating a difference-value of the counting.

5. The method for implementing the firmware root-of-trust according to claim 1, wherein the creating the node of the device-tree for the firmware root-of-trust, comprises: writing device-information into a node of a device-tree of the computer.

6. The method for implementing the firmware root-of-trust according to claim 1, wherein a Flash-chip is used as the storage-medium for the state-data of the root-of-trust.

7. The method for implementing the firmware root-of-trust according to claim 1, wherein a cryptographic mechanism is adopted to ensure security of the state-data of the firmware root-of-trust.

8. The method for implementing the firmware root-of-trust according to claim 1, wherein the operating-system and application-programs change the state-data of the firmware root-of-trust through the instruction-interface of the firmware root-of-trust.

9. The method for implementing the firmware root-of-trust according to claim 6, wherein the state-data of the firmware root-of-trust is stored into the Flash-chip in real time.

10. A computer device, comprising: a memory and a processor, wherein computer-readable instructions are stored in the memory and operable in the processor, and when the processor executes the computer-readable instructions, the processor performs operations comprising: setting a storage-medium for storing state-data of the firmware root-of-trust; integrating a processing-logic of an instruction of the firmware root-of-trust into a system-firmware; initializing the firmware root-of-trust, according to the state-data of the firmware root-of-trust and a startup-command of the firmware root-of-trust; creating a node of a device-tree for the firmware root-of-trust, for an operating-system to load a driver-program corresponding to the firmware root-of-trust; and registering an instruction-interface of the firmware root-of-trust into an interface-list; and wherein the initializing the firmware root-of-trust according to the state-data of the firmware root-of-trust and the startup-command of the firmware root-of-trust, comprises: obtaining the state-data of the firmware root-of-trust from the storage-medium; configuring an operating-state of the firmware root-of-trust according to the state-data of the firmware root-of-trust; loading persistent-data stored in the firmware root-of-trust from a user; and executing the startup-command of the firmware root-of-trust, to initialize internal data of the firmware root-of-trust; executing the instruction of the firmware root-of-trust through the driver-program, and obtaining a processing-result of the instruction of the firmware root-of-trust; and wherein the executing the instruction of the firmware root-of-trust through the driver-program and obtaining the processing-result of the instruction of the firmware root-of-trust, comprises: receiving an access-request for the firmware root-of-trust indicating that the instruction of the firmware root-of-trust input from the user is received, through an operating-interface of the firmware root-of-trust provided by the operating-system; storing current states of a stack and a register; calling the instruction-interface to process the instruction of the firmware root-of-trust; obtaining a processing-result of the instruction-interface; restoring states of the stack and the register; and returning the processing-result of the instruction of the firmware root-of-trust.

11. A non-transitory computer-readable storage-medium, storing computer-readable instructions, wherein, when the computer-readable instructions are executed by a processor, the computer-readable instructions cause the processor to perform operations comprising: setting a storage-medium for storing state-data of the firmware root-of-trust; integrating a processing-logic of an instruction of the firmware root-of-trust into a system-firmware; initializing the firmware root-of-trust, according to the state-data of the firmware root-of-trust and a startup-command of the firmware root-of-trust; creating a node of a device-tree for the firmware root-of-trust, for an operating-system to load a driver-program corresponding to the firmware root-of-trust; and registering an instruction-interface of the firmware root-of-trust into an interface-list; and wherein the initializing the firmware root-of-trust according to the state-data of the firmware root-of-trust and the startup-command of the firmware root-of-trust, comprises:

obtaining the state-data of the firmware root-of-trust from the storage-medium;

configuring an operating-state of the firmware root-of-trust according to the state-data of the firmware root-of-trust; loading persistent-data stored in the firmware root-of-trust from a user; and executing the startup-command of the firmware root-of-trust, to initialize internal data of the firmware root-of-trust; executing the instruction of the firmware root-of-trust through the driver-program, and obtaining a processing-result of the instruction of the firmware root-of-trust; and wherein the executing the instruction of the firmware root-of-trust through the driver-program and obtaining the processing-result of the instruction of the firmware root-of-trust, comprises: receiving an access-request for the firmware root-of-trust indicating that the instruction of the firmware root-of-trust input from the user is received, through an operating-interface of the firmware root-of-trust provided by the operating-system; storing current states of a stack and a register;

calling the instruction-interface to process the instruction of the firmware root-of-trust;

obtaining a processing-result of the instruction-interface; restoring states of the stack and the register; and returning the processing-result of the instruction of the firmware root-of-trust.

* * * * *